Dec. 5, 1967 W. C. HOWARD 3,356,080
INTERNAL COMBUSTION ENGINE WITH WOBBLE PLATE SHAFT DRIVE
Filed Dec. 29, 1965 3 Sheets-Sheet 3

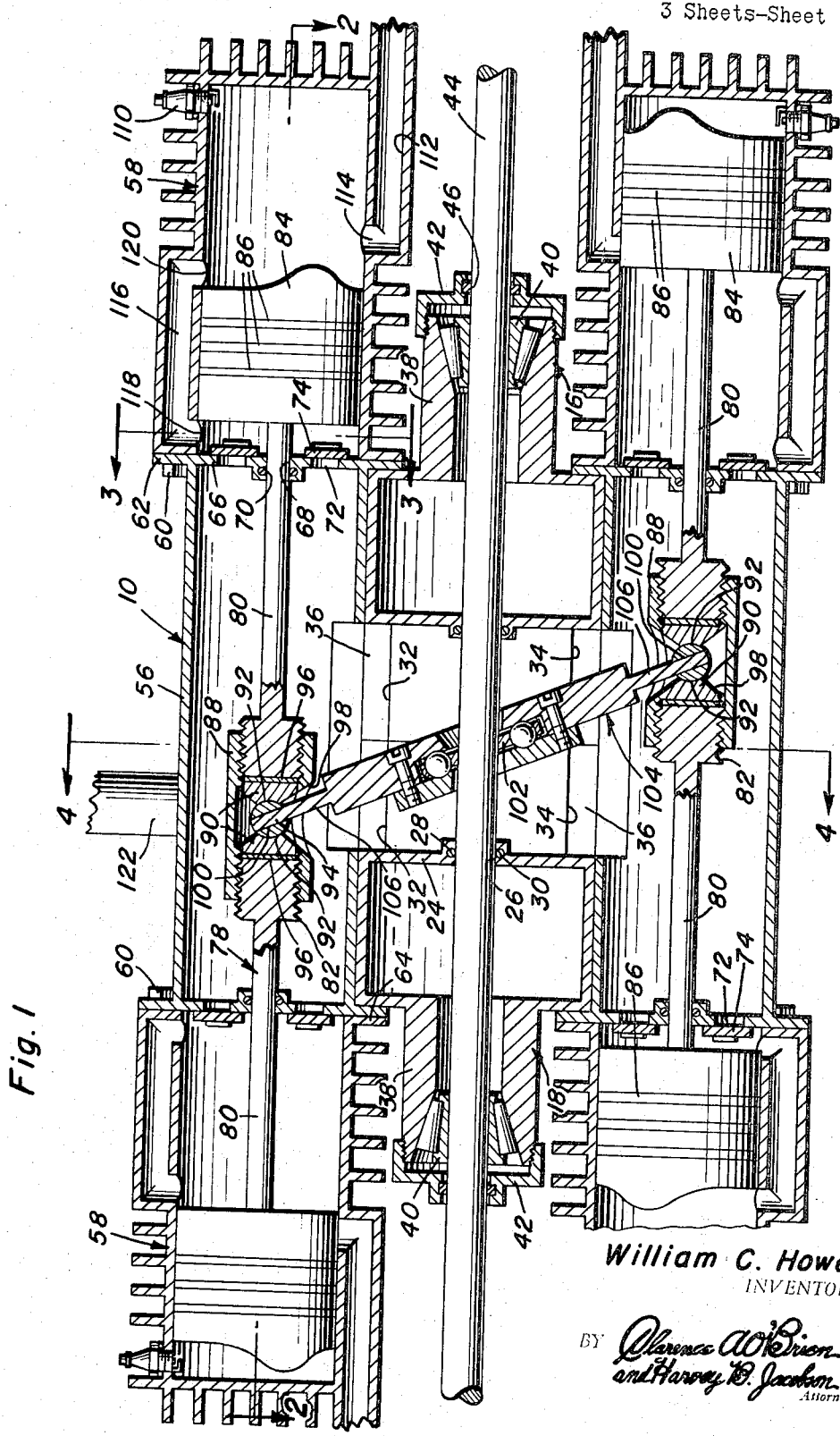

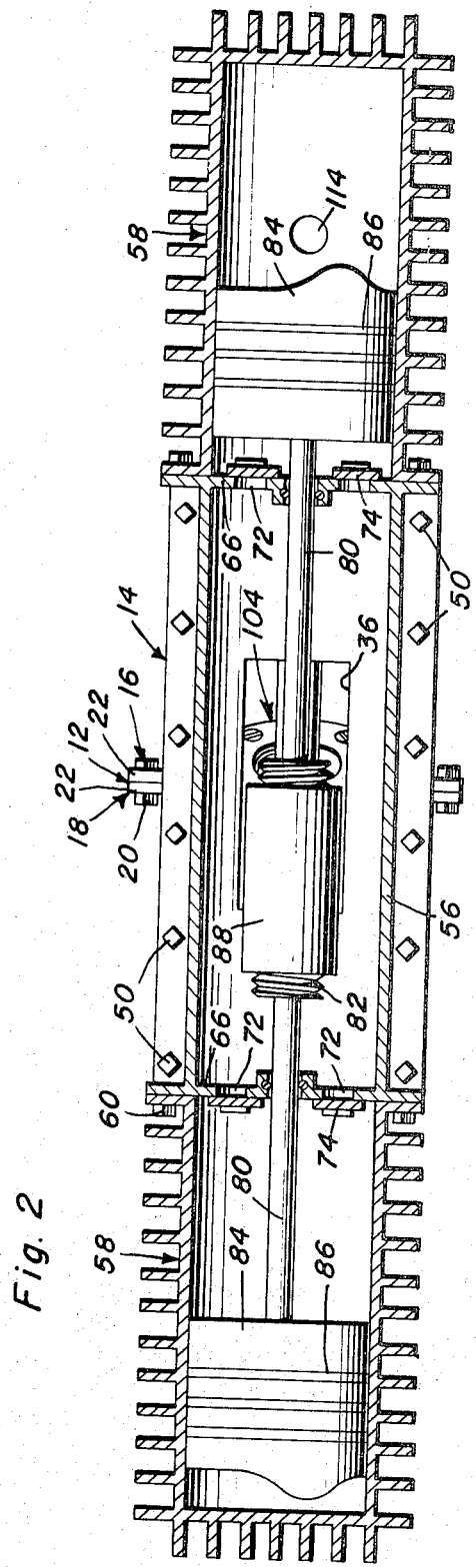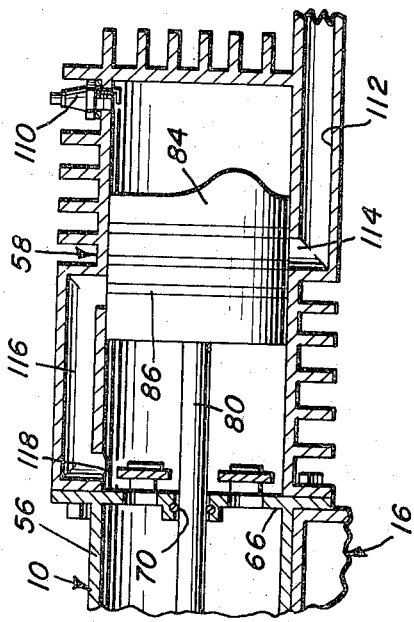

William C. Howard
INVENTOR

BY Clarence A. O'Brien
and Harvey B. Jacobson
Attorneys

United States Patent Office 3,356,080
Patented Dec. 5, 1967

3,356,080
INTERNAL COMBUSTION ENGINE WITH WOBBLE PLATE SHAFT DRIVE
William C. Howard, Olden, Tex., assignor of thirty-three percent to Thomas W. Wooton and thirty-three percent to William A. Morgan, Midland, Tex.
Filed Dec. 29, 1965, Ser. No. 517,244
6 Claims. (Cl. 123—48)

ABSTRACT OF THE DISCLOSURE

A movement transmitting assembly including a shaft journaled for rotation and a drive member supported for reciprocation along a path generally paralleling the shaft with means being provided operative to vary the spacing between the path and the shaft as well as means drivingly connecting the drive member to the shaft for rotation of the latter in response to reciprocation of the drive member and operable to vary the length of the stroke of reciprocation of the drive member as the distance between the path and the shaft is varied.

---

This invention relates to a novel and useful movement transmitting assembly and more specifically to a movement transmitting assembly or drive mechanism adapted to be utilized as a means for converting rectilinear reciprocal movement of a driving member into rotary movement of a driven member.

A particular application in which the movement transmitting assembly of the instant invention may be used to great advantage is that of a drive connection between a rectilinearly reciprocal piston of an internal combustion engine and a rotating power output shaft of such an engine. In such an application, a centrally disposed crankshaft may be surrounded by a plurality of elongated cylinder members having piston assemblies slidably disposed therein for reciprocation along paths generally paralleling the axis of rotation of the power output shaft, with the movement transmitting assembly establishing a wobble plate-type drive between the piston assemblies and the rotating output shaft.

The main object of this invention is to provide a new and useful movement transmitting or drive assembly of the aforementioned type and which may be readily adjusted so as to vary the distance the driving member is moved in each cycle of reciprocation independently of a change in the angular displacement of the rotating power output shaft during each such cycle. By this type of construction the effective compression ratio of an internal combustion engine whose piston assemblies comprise the aforementioned driving members may be readily varied.

Another object of this invention is to provide a movement transmitting assembly in accordance with the preceding object and which may also serve to drive the aforementioned drive member by means of the aforementioned driven member.

Yet another object of this invention is to provide an internal combustion engine of the reciprocating piston-type and including a rotatable output shaft with the drive assembly of the instant invention providing a driving connection between the reciprocating pistons and the output shaft.

A still further object of this invention is to provide an internal combustion engine constructed in accordance with the immediately preceding object and including fuel and air intake means specifically designed for use in connection with the aforementioned internal combustion engine.

A final object of this invention to be specifically enumerated herein is to provide a movement transmitting or drive assembly in accordance with the preceding object and which will conform to conventional forms of manufacture, be of simple construction and readily adaptable for use in numerous environments so as to provide a device that will be economically feasible, long lasting and have many varied uses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary sectional view of a reciprocating piston-type of internal combustion engine in which the pistons are reciprocated along paths generally paralleling the rotatable output shaft of the internal combustion engine and including a novel movement transmitting or drive assembly for drivingly coupling the reciprocating pistons of the internal combustion engine to its rotatable output shaft for rotation of the latter in response to reciprocation of the pistons;

FIGURE 2 is a sectional view taken substantially upon a plane indicated by the section line 2—2 of FIGURE 1;

Figure 5:
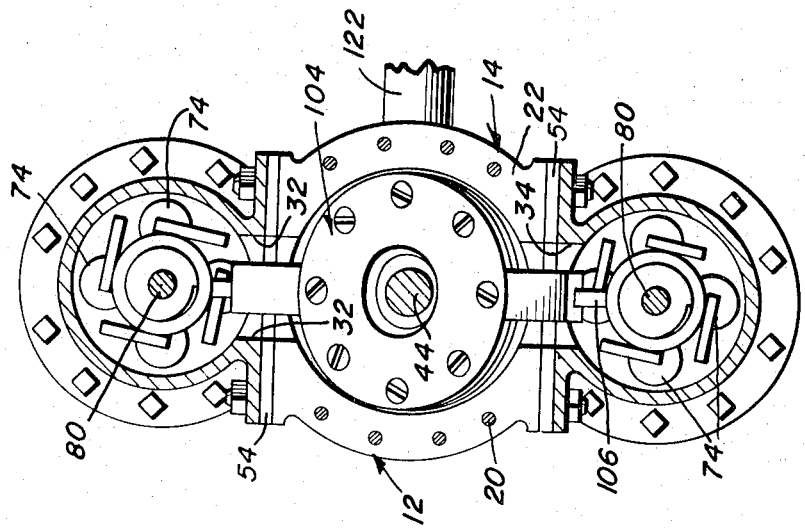
Figure 4:
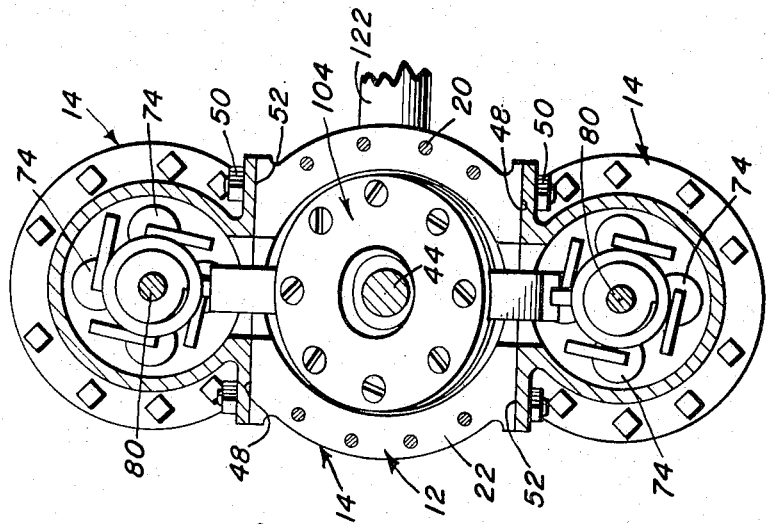
FIGURE 4 is a sectional view taken substantially upon a plane indicated by the section line 4—4 of FIGURE 1.
Figure 3:
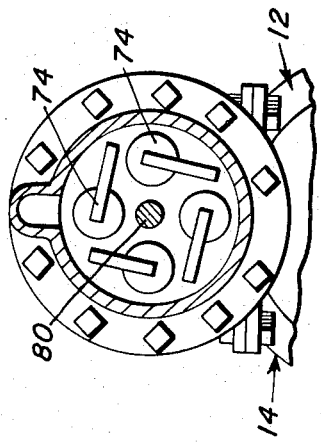
FIGURE 3 is a fragmentary sectional view taken substantially upon the plane indicated by the section line 3—3 of FIGURE 1.

FIGURE 4 is a sectional view similar to FIGURE 5 but illustrating the manner in which shims may be utilized between the crankcase of the internal combustion engine and the cylinder assemblies thereof in order to vary the spacing between the centerlines of the cylinder members and the axis of rotation of the power output shaft of the internal combustion engine; and FIGURE 6 is a fragmentary sectional view similar to the upper righthand portion of FIGURE 1 but illustrating the operation of the reed valve assemblies of the internal combustion engine as the pistons of the engine are moving during their compression strokes.

Referring now more specifically to the drawings the numeral 10 generally designates an internal combustion engine including a crankcase assembly generally referred to by the reference numeral 12 and a pair of substantially identical double ended cylinder assemblies generally referred to by the reference numerals 14. The crankcase assembly 12 includes a pair of substantially identical opposite end sections 16 and 18 which are open at their confronting ends and removably secured together by means of suitable fasteners 20 secured through confronting flange portions 22 on their adjacent ends.

Each of the end sections 16 and 18 includes an intermediate transverse wall 24 having a centrally disposed bore 26 formed therethrough and a pressure sealing O-ring seal 28 is seated in a groove 30 formed in each of the bores 26. The adjacent ends of the end sections 16 and 18 include diametrically opposite slots or notches 32 and 34 and each pair of corresponding notches 32 and 34 defines a circumferentially extending opening 36 in the corresponding side of the crankcase assembly 12. Further, the remote ends of the end sections 16 include oppositely directed neck portions 38 having roller bearing assemblies 40 secured in their outer ends by means of a bearing retaining and shaft sealing removable caps 42.

A power output shaft 44 is rotatably journaled through the crankcase assembly 12 by means of the bearing assemblies 40 and the retaining caps 42 include sealing portions 46 forming a substantially fluid-tight seal with the output shaft 44.

The opposite sides of the crankcase assembly 12 in which the openings 36 are formed include generally parllel flat mounting surfaces 48 to which the cylinder assemblies 14 are secured by means of fasteners 50. It may be seen from FIGURE 4 of the drawings that the cylinder assemblies 14 each include corresponding flat mounting surfaces 52 disposed in surface-to-surface contacting relation with the surfaces 48 thereby rigidly supporting the cylinder assemblies 14 from the crankcase assembly 12. However, in FIGURE 5 of the drawings it may be seen that spacing shims 54 may be used between each pair of opposing surfaces 48 and 50 in order to vary the spacing between the centerlines of the assemblies 14 and the axis of rotation of the shaft 44.

Each of the cylinder assemblies 14 includes a center section 56 and a pair of opposite end cylinder members generally referred to by the reference numerals 58 secured to the opposite ends of the corresponding center section 56 by means of suitable fasteners 60 secured through apertured flange portions 62 formed on the opposite ends of each center section 56 and corresponding flange portions 64 carried by the base ends of the cylinder members 58.

The opposite ends of the center sections 56 include end walls 66 including centrally disposed bores 68 also provided with O-ring seals 70. In addition, each of the end walls 66 is also provided with a plurality of air and fuel induction apertures 72 and each aperture 72 has a spring urged reed valve 74 operatively associated therewith and functioning to allow the passage of an air and fuel mixture from the center sections 56 of the cylinder assemblies 14 into the cylinder members 58.

A piston assembly generally referred to by the reference numeral 78 is disposed in each of the cylinder assemblies 14 and includes a pair of end lined and axially spaced piston rod portions 80 whose adjacent terminal end portions 82 are diametrically enlarged and externally threaded. The remote ends of the piston rod portions 80 have pistons 84 removably secured thereto and each pair of pistons 84 is slidably disposed in the corresponding cylinder member 58 and provided with suitable piston rings 86. The terminal end portions 82 of each pair of corresponding piston rod portions 80 are oppositely threaded and removably coupled together by means of a sleeve member 88 whose opposite end portions are oppositively internally threaded. A pair of support blocks 90 are disposed within the sleeve member 88 between the terminal end portions 82 of each pair of piston rod portions 80 and include opposing partial spherical seats 92 between which a spherical bearing member 94 is disposed. In addition removable shims 96 are disposed between the terminal end portions 92 and the remote ends of the blocks 90.

The sleeve member 88 has a large generally radial bore 98 formed therein and the bearing member 94 has a diametric bore 100 formed therethrough.

The power output shaft 44 has an inclined disk 102 rigidly secured to its mid-portion between the transverse walls 24 and a wobble plate assembly generally referred to by the reference numeral 104 is clamped about and journaled on the disk 102. Diametric opposite portions of the wobble plate assembly 104 include smooth cylindrical and oppositely directed shaft portions 106 which are rotatably and slidably disposed in the corresponding bores 100 and it may therefore be seen that inverse reciprocation of the piston assemblies 78 will effect rotation of the power output shaft 44.

Each of the cylinder members is provided with a suitably actuated spark plug 110 and includes an exhaust passage 112 communicated with two of the corresponding cylinder members 58 by means of an exhaust port 114. In addition, the inner end portions of the cylinder members 58 disposed between the pistons 84 and the end walls 66 are intermittently communicated with the interior of the portions of the cylinder members 58 disposed on the opposite sides of the pistons 84 by means of air and fuel inlet bypass passages 116 opening into the base ends of the cylinder members 58 adjacent the end wall 66 by means of inlet ports 118 and into the head ends of cylinder members 58 by means of outlet ports 120. Further, a main fuel and air mixture inlet manifold 122 is provided and is communicated with the interior of the crankcase assembly 12.

With attention now invited to FIGURES 2 and 6 of the drawings, it will be seen that as the piston assembly 78 moves to the right from the position illustrated in FIGURE 2 of the drawings to the position illustrated in FIGURE 6 of the drawings a partial vacuum will be formed in the cylinder member 58 illustrated in FIGURE 6 behind the piston 84 thereby drawing air and fuel mixture from the crankcase assembly 12 into the cylinder member 58. As the piston 84 shifts from the position illustrated in FIGURE 2 to the position illustrated in FIGURE 6, the ports 120 and 114 are successively covered by the piston 84 to the right as viewed in FIGURE 6 will, of course, compress the air and fuel mixture within the closed end of the cylinder member 58 in preparation to thereafter being ignited by means of the spark plug 110. Thereafter, the expanding burning gases will push the piston 84 to the left as viewed in FIGURE 6 and cause the exhaust port 114 to be first uncovered venting the combustion chamber to the ambient atmosphere. Thereafter, continued movement of the piston 84 to the left as viewed in FIGURE 6 will cause the air and fuel mixture disposed between the piston 84 and the end wall 66 to be compressed. Then, as the piston 84 reaches its limit position of movement toward the left as viewed in FIGURE 6 of the drawings, the outlet port 120 will be uncovered, see FIGURE 1, thereby enabling the compressed air and fuel mixture disposed between the piston 84 and the corresponding end wall 66 to pass through the passage 116 and into the portion of the cylinder member 58 defining the combustion chamber.

Accordingly, it may be seen that the internal combustion engine 10 is of the two-stroke-type and that reciprocation of the piston assembly 78 will cause the air and fuel mixture supplied to the engine 10 to be pumped into the combustion chambers of the cylinder members 58 in timed sequence with the reciprocation of the piston assembly 78. Further, the compression ratio of the engine 10 may be readily varied by removing or adding additional shims 96 and the effective stroke of the piston assemblies 78, the compression ratio of the engine 10 and the torque generating characteristics of the engine 10 may be varied upon changing the spacing between the centerlines of the assemblies 14 and and the shaft 44 by removing or adding the shims 54.

Although the engine 10 has been illustrated and described as including only one pair of diametrically oppositely disposed cylinder assemblies 14, it is to be noted that the crankcase assembly 12 could be provided with any feasible member of flat mounting surfaces corresponding to the surfaces 48 and that a corresponding feasible number of cylinder assemblies 14 could be utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A movement transmitting assembly comprising a journaled shaft, a drive member, first means mounting said drive member for reciprocation along a path generally paralleling the axis of rotation of said shaft, said first means including means operative to vary the spacing between said path and said axis, and second means drivingly connecting said reciprocal member and said shaft for rotation of said shaft in response to reciprocation of said drive member and operable to vary the length of the stroke of reciprocation of said drive member as the distance between said path and said axis is varied.

2. The combination of claim 1 wherein said second means includes means operable to inversely vary the length of the stroke of said drive member as the distance between said path and said axis is varied.

3. The combination of claim 1 wherein said drive member comprises a rectilinearly reciprocal piston rod portion of a reciprocal piston-type internal combustion engine and said shaft comprises the rotatable power output shaft of said engine.

4. The combination of claim 3 wherein said internal combustion engine includes a housing portion comprising said first means and from which said shaft is journaled and which includes an outer mounting surface disposed normal to a radius of the axis of rotation of said shaft, a cylinder member mounted on said outer mounting surface and including a piston bore generally paralleling said axis, a piston reciprocal in said bore, said piston rod portion being secured to said piston for reciprocation therewith, said bore including a closed end defining a combustion chamber, and means operatively associated with said chamber for charging said chamber with a combustible mixture and exhausting the by-products of combustion of said material from said chamber in timed sequence with reciprocation of said piston.

5. The combination of claim 4 wherein said engine includes means for shifting said outer mounting surface toward and away from said axis.

6. The combination of claim 1 wherein said drive member comprises a rectilinearly reciprocal piston rod portion of a reciprocal piston-type internal combustion engine and said shaft comprises the rotatable power output shaft of said engine, said engine including a plurality of reciprocal piston rod portions each similar to the first mentioned piston rod portion, said piston rod portions being spaced generally equally about said shaft and drivingly connected thereto in a like manner.

References Cited

UNITED STATES PATENTS

| 1,061,025 | 5/1913 | Tangeman | 123—74 |
| 1,802,902 | 4/1931 | Brau | 123—58 |
| 1,826,325 | 10/1931 | Paul | 123—48 |

FOREIGN PATENTS 556,396   4/1923   France.

WENDELL E. BURNS, *Primary Examiner.*